(12) United States Patent
Santos et al.

(10) Patent No.: US 12,645,268 B2
(45) Date of Patent: Jun. 2, 2026

(54) GRAPHICAL PROCESSING UNIT BRACKET

(71) Applicant: Maingear, Inc., Warren, NJ (US)

(72) Inventors: Wallace Santos, Warren, NJ (US);
Matthew Rigassio, Warren, NJ (US)

(73) Assignee: Maingear, Inc., Warren, NJ (US)

( * ) Notice: Subject to any disclaimer, the term of this patent is extended or adjusted under 35 U.S.C. 154(b) by 93 days.

(21) Appl. No.: 18/670,813

(22) Filed: May 22, 2024

(65) Prior Publication Data

US 2025/0362722 A1 Nov. 27, 2025

(51) Int. Cl.
G06F 1/185 (2026.01)

(52) U.S. Cl.
CPC ................................... G06F 1/185 (2013.01)

(58) Field of Classification Search
CPC ...................................................... G06F 1/185
See application file for complete search history.

(56) References Cited

U.S. PATENT DOCUMENTS

| | | | |
|---|---|---|---|
| 6,404,624 B1* | 6/2002 | Jeong | G06F 1/187 |
| | | | 361/679.41 |
| 8,559,170 B2* | 10/2013 | Lee | G06F 1/185 |
| | | | 361/728 |
| 2004/0174687 A1 | 9/2004 | Wang et al. | |

OTHER PUBLICATIONS

International Search Report for international application No. PCT/US2025/028813, mailing date Oct. 23, 2025.

* cited by examiner

*Primary Examiner* — James Wu
(74) *Attorney, Agent, or Firm* — Michael J. Feigin, Esq.; Feigin and Fridman LLC

(57) ABSTRACT

A bracket for a GPU is used to hold the GPU in place while electrically connected to a motherboard. The bracket has horizontal and vertical sections with indents and crevices adapted to fit a GPU there-against.

16 Claims, 11 Drawing Sheets

<u>50</u>

50

50

50

89

88

50

55

59

53

57

69

60a

60

GRAPHICAL PROCESSING UNIT BRACKET

FIELD OF THE DISCLOSED TECHNOLOGY

The disclosed technology relates generally to computer parts, and more specifically to brackets used within computer cases.

BACKGROUND OF THE DISCLOSED TECHNOLOGY

Graphical Processing Units (GPUs) are powerful components that generate a significant amount of heat during operation. The units are connected to the motherboard via a PCI Express (PCIe) slot, which provides the necessary data and power connections. If a GPU becomes disconnected from the motherboard while the system is running, this creates dangers to the hardware components. Given that GPUs are, at the time of this writing, getting larger, denser, and heavier this is becoming a greater problem, especially when GPUs are attached to a vertically-oriented motherboard.

System instability and crashes occur when a GPU loses electrical connection to the motherboard with at least some pins disconnecting. This can result in data loss or corruption if the system is not properly shut down. A disconnected GPU may cause electrical shorts or power surges, which can potentially damage the GPU itself, the motherboard, or other connected components. This can lead to expensive repairs or replacements. Without a proper connection to the motherboard, a GPU may continue to run and generate heat without proper cooling or power regulation. This can lead to overheating, which can cause permanent damage to the GPU or even pose a fire hazard if temperatures become extreme. If a GPU disconnects during intensive graphics processing tasks, such as rendering, gaming, or video editing, it can result in data corruption or loss of unsaved work. When removing or installing a GPU, there is a risk of static electricity buildup, which can damage sensitive components on the GPU or motherboard if proper precautions are not taken.

There exists a growing need in the art to provide safer use of a GPU in a computer system.

SUMMARY OF THE DISCLOSED TECHNOLOGY

A bracket of embodiments of the disclosed technology has a first section and a second section joined perpendicular to each other. The bracket has a first and second section. The first section is a "vertical" section and the second section is a "horizontal" section described as such relative to one another and based on an embodiment where attached to a vertically oriented motherboard.

The first section has a flat back side and a front side, opposite said flat back side, having an indented region adjacent to a perpendicular bend between the first and second sections. "Flat" for purposes of this disclosure is defined as having "little or no projection or relief" and/or "lacking rounded and curved regions". "Opposite a side" is defined as "having an elongated and substantially flat surface which faces in a direction away from the side which is opposite thereto.

The second section has, in order, a proximate region, a mid-region, and a distal region. The regions are named relative to a corner bend between the first and second sections of the bracket and are divided by acute bends (though, relative to one another, one bend is 'acute' and the other is 'obtuse', or said another way, the bends acutely extend in an opposite direction the each other). The proximate region is thus adjacent to the perpendicular bend between the first section and the second section. This region is perpendicular to the first section of the bracket. The mid-region joins (forms a unitary structure with) the proximate region at an acute bend and the distal region. The distal and proximate regions are at opposite ends of the mid-region and parallel to each other (the longest linear extent of each, if extended in an infinite line, would never meet).

The bracket of claim 1 can be formed, or substantially formed, as a single, unitary structure. Flanges, however, can be fixedly attached such as by way of screws. A "unitary structure" is one in which is a single molded, extruded, printed, or otherwise created structure. "Fixedly attached" is defined as "two parts held together during designed usage of the bracket".

Various screw holes are present, in embodiments of the disclosed technology, to hold the GPU to the bracket and the bracket to a mother board. Such holes or portals exist in groups of one or two in any or each of: a) flange extending perpendicularly (on an outdent) from a distal region of the horizontal arm; flange extending perpendicularly from a thickest region of the vertical arm (on an outdent); and through a thinner region of the vertical arm. An "outdent" is the opposite of an "indent"; it is a flange that extends outwards from another structure described.

Described another away, a bracket of embodiments of the disclosed technology has channels with side walls and end walls through a bottom side (a side which faces towards the ground when the bracket is attached to a vertically-oriented motherboard; and/or a side facing towards a plane interior to the vertical and horizontal arms) of a horizontal part of the bracket. The end walls can be a front wall being an interior side of the vertical section of the bracket and a flange (opposite the front wall). The opposite-side flange can be a back plate connected to, and perpendicular to, the bottom side of the channel. The back plate/flange can have an indented region surrounded by side walls joining, at least one one side, with a side wall of the channel.

Screw holes on the bracket can be: a) through an outdented region of the back plate; b) through an outdented region of the distal part of the horizontal arm; c) a flange extending outwards from the channel; d) on a flange extending outwards from the channel in a direction opposite the flange with the screw hole described in 'c'.

The channel, in embodiments of the disclosed technology, has a cutaway in one of the side walls adjacent to the back plate which is adapted for passage of a power cable into the channel through the cutaway.

The bracket arms or sections can be adapted for attachment and abutment against a motherboard (first arm) and extending away from the motherboard (second arm) perpendicular to each other. A flange is attached perpendicular to, and attached to the second arm, which is parallel to the first arm and out of a plane extending from the first arm towards the second arm at a right angle to the longest extent of the respective arms.

"Substantially" and "substantially shown," for purposes of this specification, are defined as "between and including 90% to 100%," or as otherwise indicated. "identical" or "exactly," for purposes of this specification, is defined as "within an acceptable tolerance level known in the art." Any device may "comprise," or "consist of," the devices mentioned there-in, as limited by the claims. Any element described may be one of "exactly" or "substantially," as described.

It should be understood that the use of "and/or" is defined inclusively, such that the term "a and/or b" should be read to include the sets: "a and b," "a or b," "a," or "b."

DETAILED DESCRIPTION OF EMBODIMENTS OF THE DISCLOSED TECHNOLOGY

A bracket for a GPU is used to hold the GPU in place while electrically connected to a motherboard. The bracket has horizontal and vertical sections with indents and crevices adapted to fit a GPU there-against.

Embodiments of the disclosed technology will become more clear in view of the following description of the figures.

Figure 1:
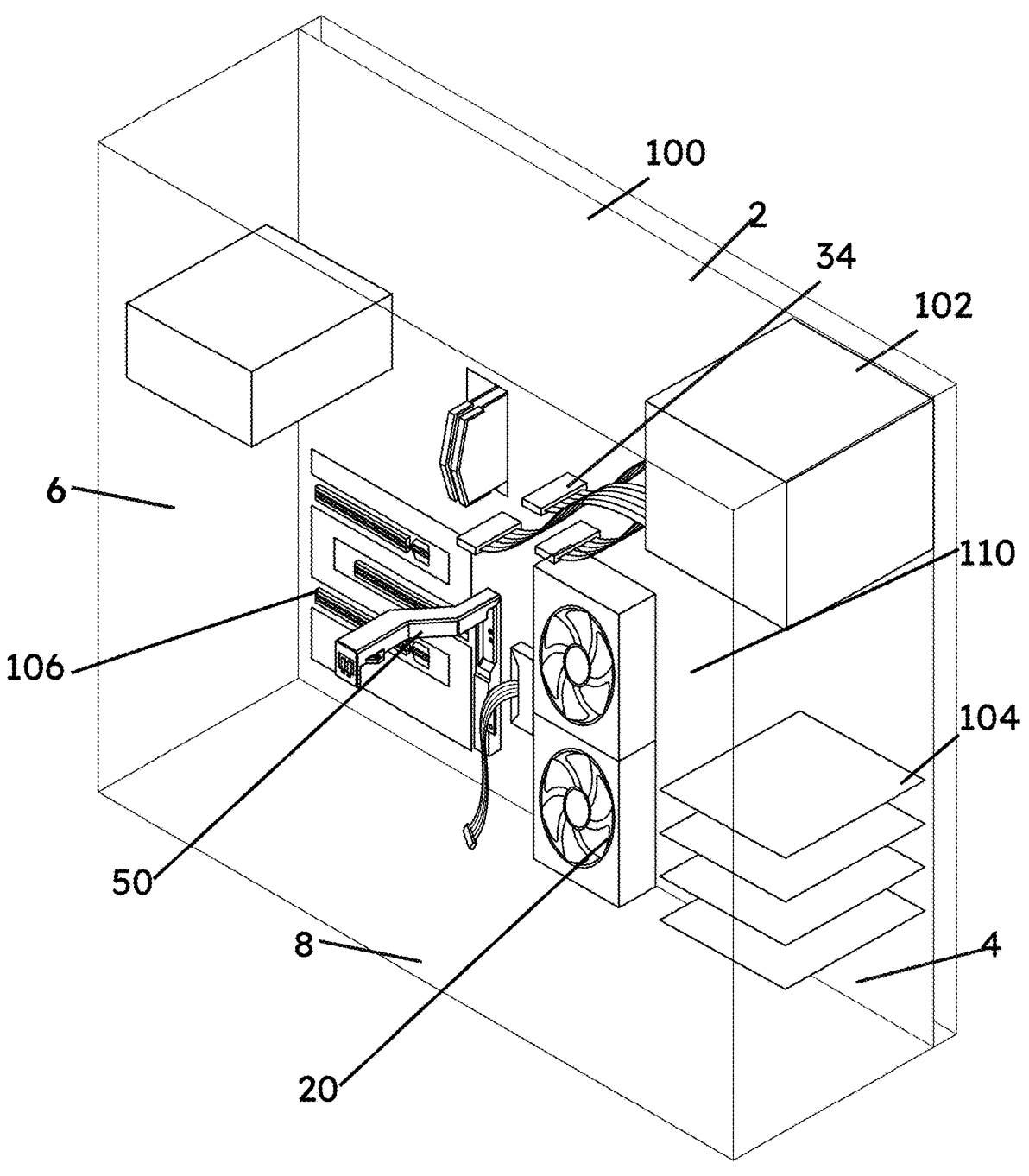
FIG. 1 shows a computer case with motherboard and graphics processing unit (GPU) bracket in an embodiment of the disclosed technology.

FIG. 1 shows a computer case with motherboard and graphics processing unit (GPU) bracket in an embodiment of the disclosed technology. The computer case 100 has a lower side 8 opposite a top side 2. Back side 6 is opposite front side 4, which are perpendicular to top side 2 and lower side 8. A bottom side is opposite the top side 2. It should be understood that these labels, and the shape of computer case 100, may vary from one embodiment to another.

A motherboard 110, also known as a main board or system board, is the main printed circuit board (PCB) in a computer. It is the central component that allows communication between all the other components of the computer system, such as the CPU (Central Processing Unit), memory (RAM), storage devices 104 (hard drives, solid-state drives), and other peripherals such as a graphics processing unit (GPU) 40. The motherboard 110 has Power connectors such as to a power supply unit (PSU) 102 which provides electrical current to cable/wires 34 used to power the motherboard, fans 20, and other devices within the computer case 100. The cables provide electrical power to all the components. Peripherals, such as video cards, sound cards, additional ports, and so forth can be attached to expansion slots, such as PCI slots, 106.

PCI slots 106 can include PCIe slots where a GPU 40 is inserted. A PCIe bracket (or bracket) 50 is a somewhat L-shaped bracket fixedly attached to the GPU card. It has a back plate 64 (see FIG. 5) that slides into the PCIe slot on the motherboard to secure and ground the GPU. A bracket slot is a cut-out slot on the back panel of the computer case that aligns with the PCIe slot on the motherboard 110. Bracket screws are are screws on the back panel that thread into the PCIe bracket to firmly secure the GPU in place once inserted into the PCIe slot.

Figure 2:
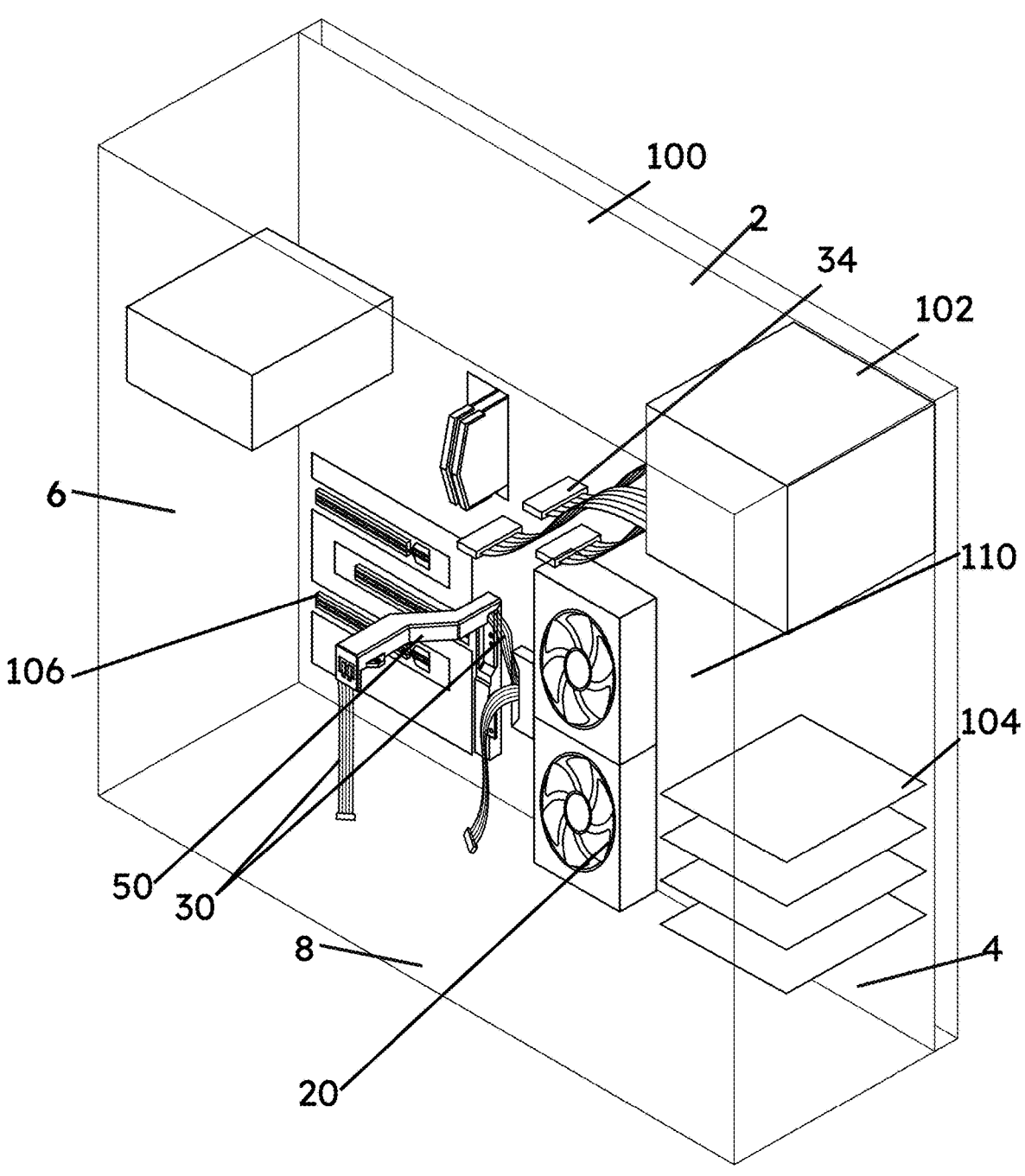
FIG. 2 shows the computer case with motherboard of FIG. 1 with a power cable extending through the GPU bracket.

FIG. 2 shows the computer case with motherboard of FIG. 1 with a power cable extending through the GPU bracket. Here, the cable 30 extends through the bracket 50, within a channel 60, discussed below.

Figure 3:
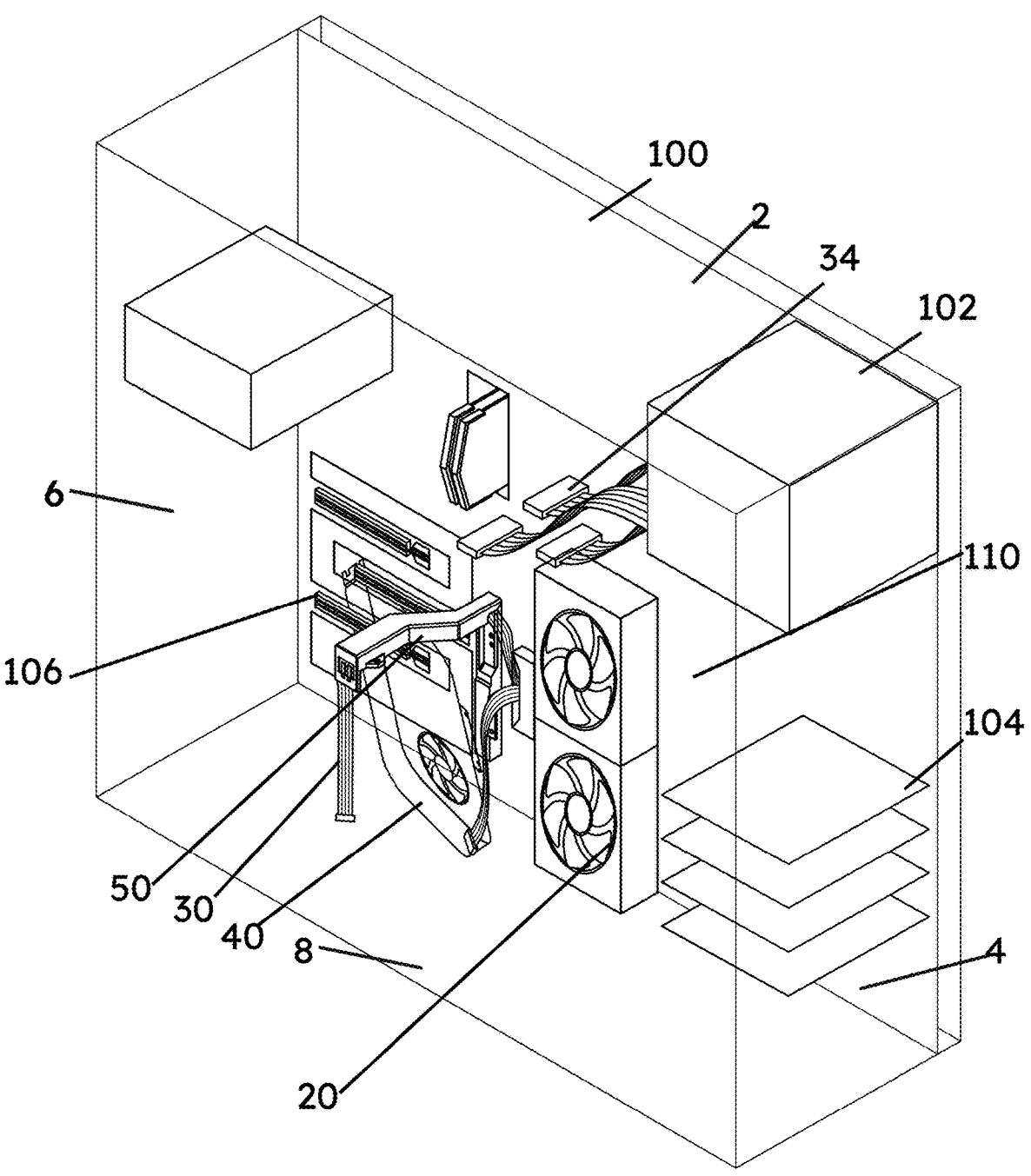
FIG. 3 shows the computer case with motherboard of FIG. 1 with a GPU being placed into the GPU bracket in an embodiment of the disclosed technology.
Figures 4, 5:
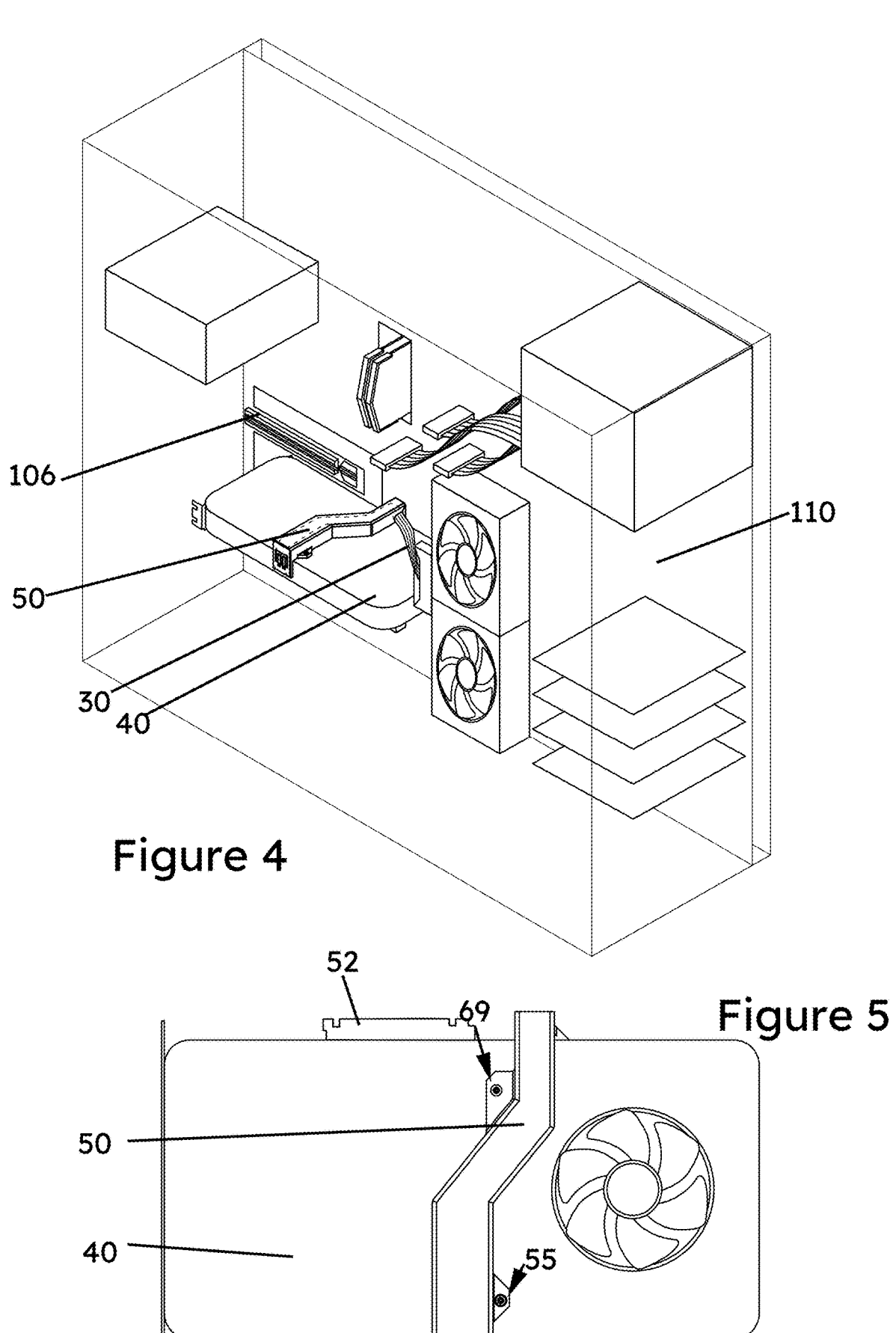
FIG. 4 shows the computer case with motherboard of FIG. 1 with the GPU held within the GPU bracket in an embodiment of the disclosed technology.
FIG. 5 shows a GPU held within a GPU bracket in embodiments of the disclosed technology.

Turning now to FIGS. 3 and 4, FIG. 3 shows the computer case with motherboard of FIG. 1 with a GPU being placed into the GPU bracket 50 in an embodiment of the disclosed technology. FIG. 4 shows the computer case with motherboard of FIG. 1 with the GPU held within the GPU bracket in an embodiment of the disclosed technology. The bracket 50 is attached to the back side of the case 100 (screws not shown though the fastening using screws of devices to a motherboard is well known and understood in the art). The bracket 50 then receives the GPU 40, being inserted therebetween the bracket and motherboard as shown. Alternatively, the GPU 40 can be secured to the bracket before the step of securing the bracket 50 to the motherboard 110.

FIG. 5 shows a GPU held within a GPU bracket in embodiments of the disclosed technology. The GPU 40 is attached via screws shown which extend through the screw holes on flanges 55 and 69. The PCIe attachment flange 52, or other electrical connector, is, in turn, inserted into a PCIe slot 106 or other electrical connector on the motherboard 110. The screw holes on the GPU 40 are standardized in the industry and thus, the bracket 50 has to be made specifically to fit this standard.

Figure 6:
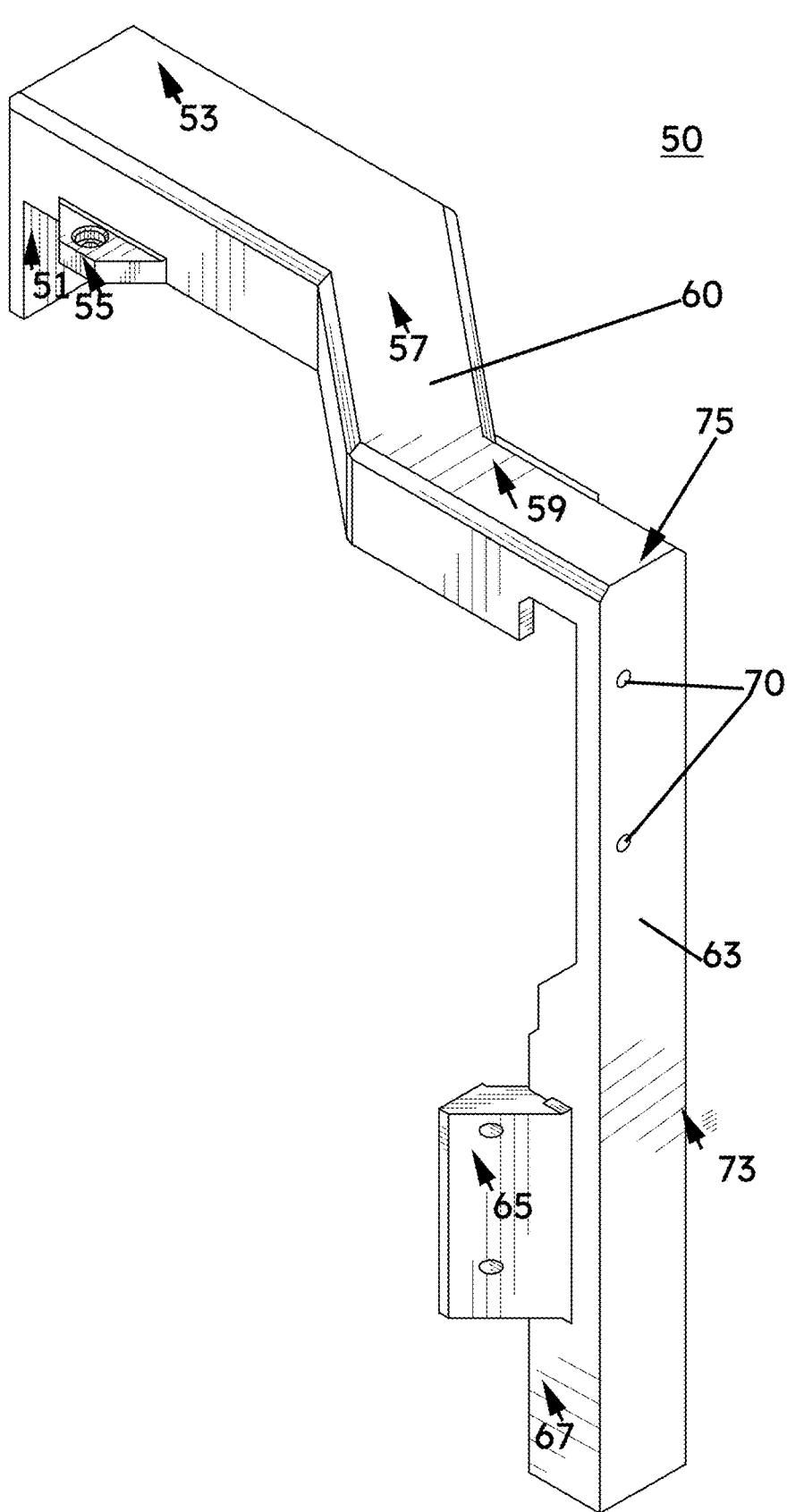
FIG. 6 shows a top perspective view of a GPU bracket in embodiments of the disclosed technology.

FIG. 6 shows a top perspective view of a GPU bracket in embodiments of the disclosed technology. The bracket 50 has two primary regions: 1) a back plate 63 which is also referred to in this disclosure as a "first arm"; and 2) horizontal arm with channel 60 which is also referred to in this disclosure as a "second section" or "second arm".

The back plate 63 has a flat back side 73. Note that for ease of viewing, lines without arrows refer to components as a whole whereas lines with arrows refer to sections of the bracket 50. The bracket is, in embodiments of the disclosed technology, a single unitary piece formed of a unitary construction. That is, the bracket can be extruded, printed, or molded (by way of example) as a single piece, or substantially as a single piece. In some embodiments, the bracket has parts or sections which are fixedly connected to each other.

Further, it should be understand that directional references are for the convenience of understanding the invention and/or relative to one another, as described herein. Thus, a "back side" refers to a side of a motherboard 110 which is connected to the computer case and/or the most elongated side which is adjacent to a computer case 100 (such as when the motherboard is attached at a rear side, instead). Thus, the "back side" 73 of the bracket 50 is the side connected to the motherboard 110, such as by way of screws through screw holes 70. The "Front side" is the side opposite the back side, and so forth.

Referring still to FIG. 6, and more specifically, the back plate 63 of the bracket 50, this region comprises a flat back or rear side 73 adapted for placement of the substantially, or all of said side, to a motherboard 110 and/or computer case 100. A flange 65 with further screw holes (as shown) extends outwards from a side of the back plate 63 corresponding with placement of screw holes in a GPU 40 being attached thereto. This flange 65 has a flat side corresponding with a front side of a lower and/or thicker region 67 of the back plate/first arm 63. Another side of the flange 65, in embodiments of the disclosed technology, is flat and fixedly attached to the rest of the back plate 63 at a flat side thereof. The flange 65 can further have an acutely angled side, forming a triangular shape allowing for shorter screws to be inserted there-through to attach to the motherboard 110 than if the flange where a rectangular prism.

Referring now to the back plate/first arm 63 with horizontal channel 60, this arm has three primary regions: 1) a proximate region 59 (proximate to a right angle bend at the meeting point of the first arm with horizontal channel 60 and back plate 63); 2) a distal region 53 (at an opposite end of the proximal region 59); and 3) a mid region 57 (between the proximal region 59 and distal region 57). The regions are defined by acute angle bends between the three regions. The proximal region 59 is parallel to the distal region 53 in embodiments of the disclosed technology. The acute bends between the regions are at opposite angles to each other in such embodiments. Further, an additional flange 55 extends outwards from the distal region 53, at a side thereof.

Figure 7:
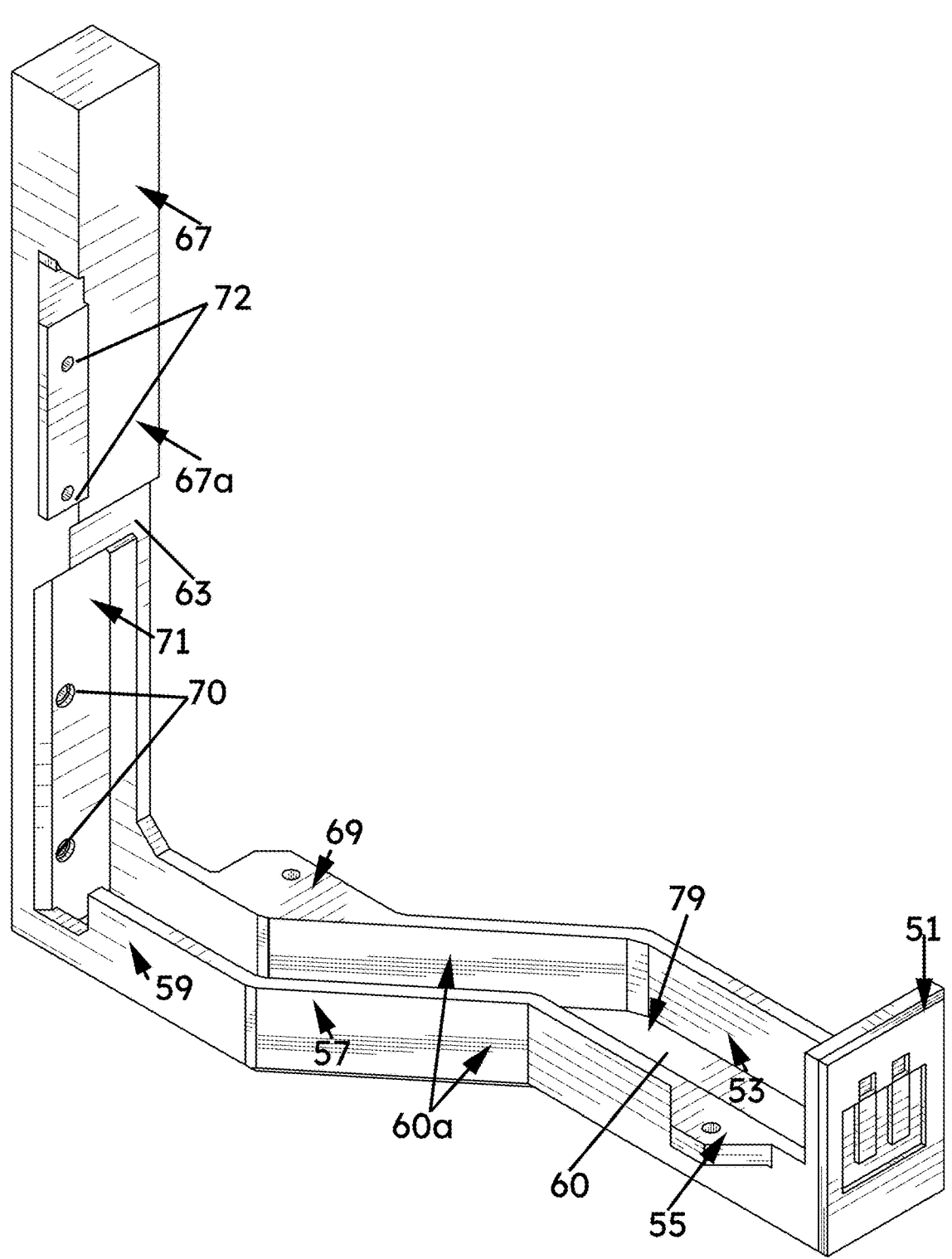
FIG. 7 shows a bottom perspective view of the GPU bracket of FIG. 6.

FIG. 7 shows a bottom perspective view of the GPU bracket of FIG. 6. In this view, the interior sides of the bracket 50 are shown, the interior sides being those which face towards a plane extending between the bottom side of the horizontal arm with horizontal channel 60 and a front side of the back plate 63. Extending from the bottom side of the top edge of the horizontal arm with horizontal channel 60 are two walls 60a surrounding and forming a channel therebetween. That channel extends between the side walls 60a and a bottom side 79 of the horizontal channel 60 in embodiments of the disclosed technology, the channel being open on a bottom side thereof. The side walls 60a terminate at a front end of the bracket 50 and proximate to, or at the distal region 53. The side walls 60a, in some embodiments, become shorter when joining the back plate and turning at the corner 75.

The channel, in embodiments of the disclosed technology, is a continuous channel comprised of the horizontal channel 60 through the back plate 63 and, continuing perpendicular thereto, through an interior side of the vertical arm as a vertical region 71 of the channel which is indented to form an indented region in embodiments of the disclosed technology. Screw holes 70 are within/pass through the vertical region 71 of the channel. The vertical arm 63 has two regions, a lower and/or thicker region 67 and a narrower region with the vertical region 71 of the channel. Said channel has, in embodiments, thicker side walls. The lower and/or thicker region 67 has screw holes 72 and is between an extreme end of the bracket 50 and the vertical region 71 of the channel. A thinner region, of the thicker region 67a, has a notch where the GPU abuts the lower and/or thicker region 67.

The channel through the horizontal arm terminates, in embodiments of the disclosed technology, at a flange 51 extending parallel to the back plate 63. The flange 51 also forms an end wall of the channel. The cable/wires 34 then extends, in some embodiments, through and/or in a direction parallel to the longest linear extend of the back plate 63 and perpendicular to the longest linear plane passing through the the entirety of a top side of the back plate 63 with horizontal channel 60.

Figure 8:
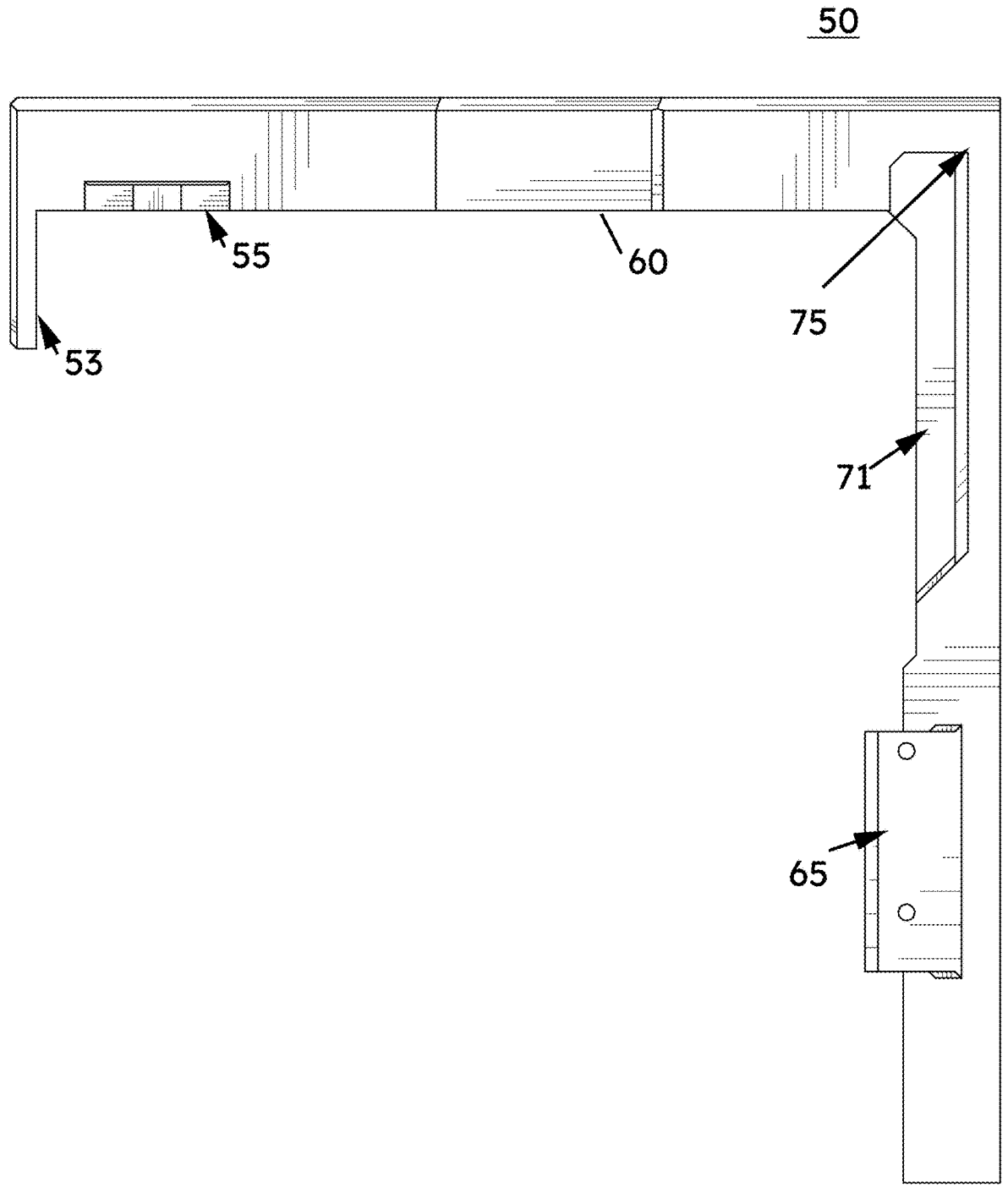
FIG. 8 shows a left side elevation view of the GPU bracket of FIG. 6.
Figure 9:
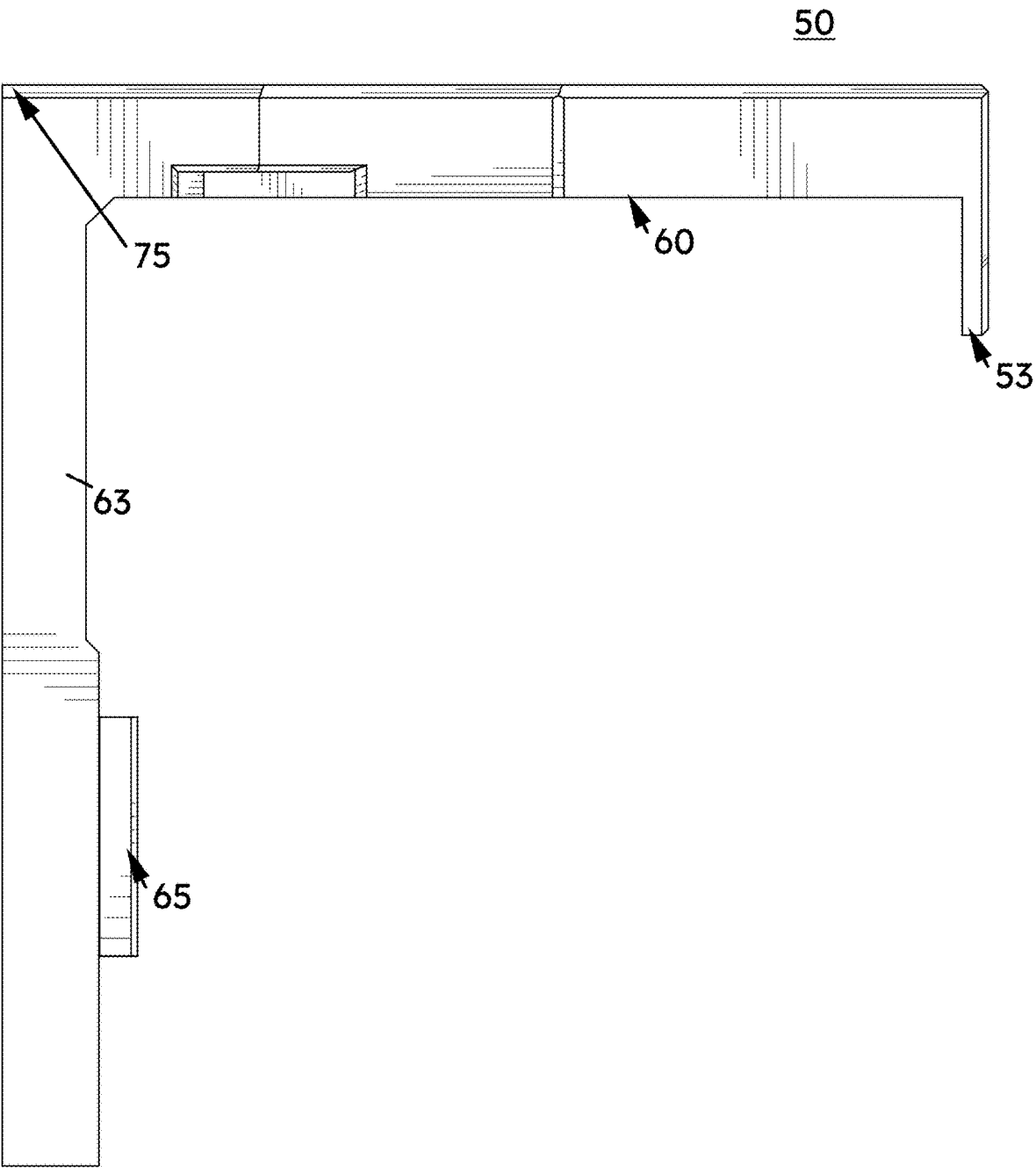
FIG. 9 shows a right side elevation view of the GPU bracket of FIG. 6.
Figure 10:
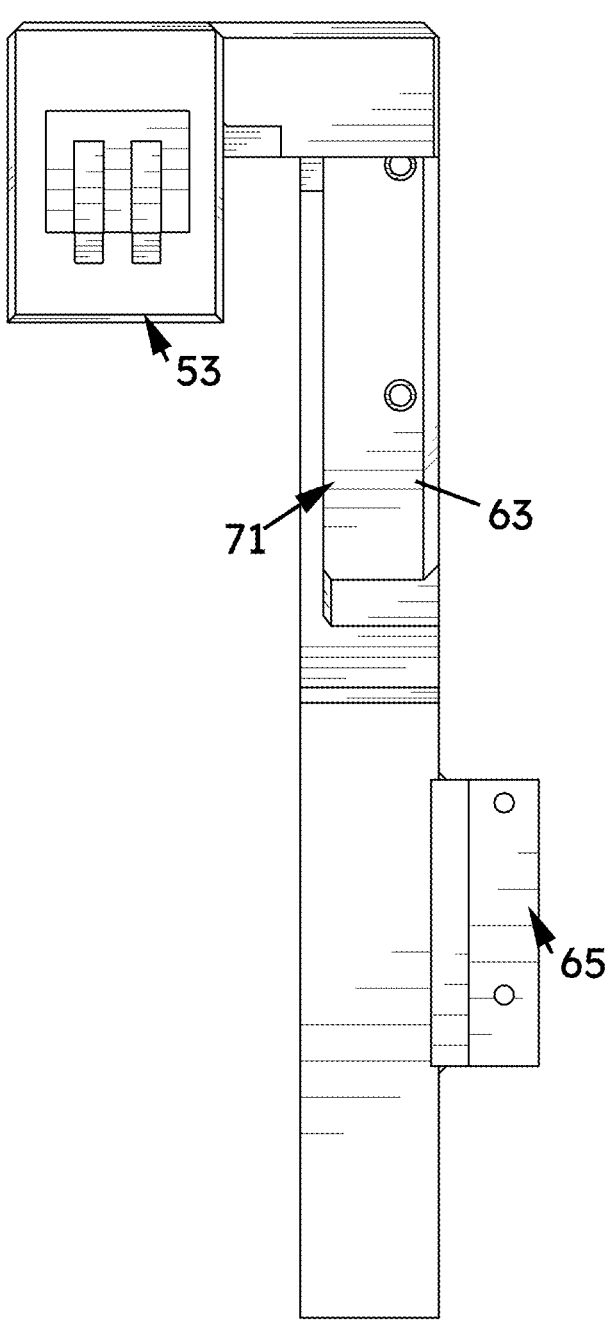
FIG. 10 shows a front side elevation view of the GPU bracket of FIG. 6.
Figure 11:
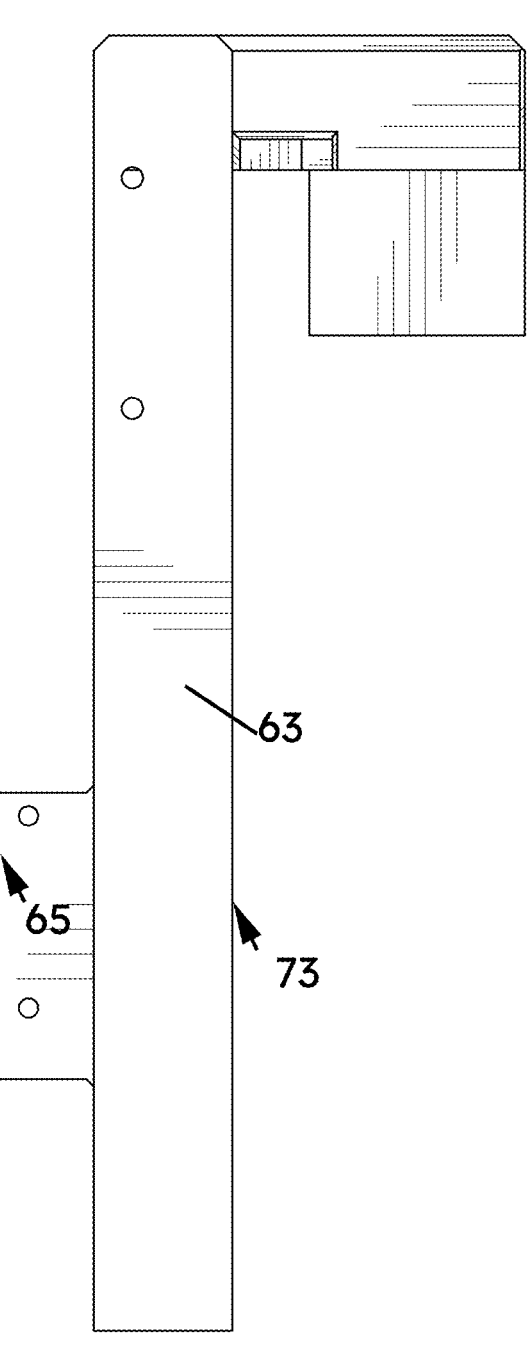
FIG. 11 shows a rear side elevation view of the GPU bracket of FIG. 6.
Figure 12:
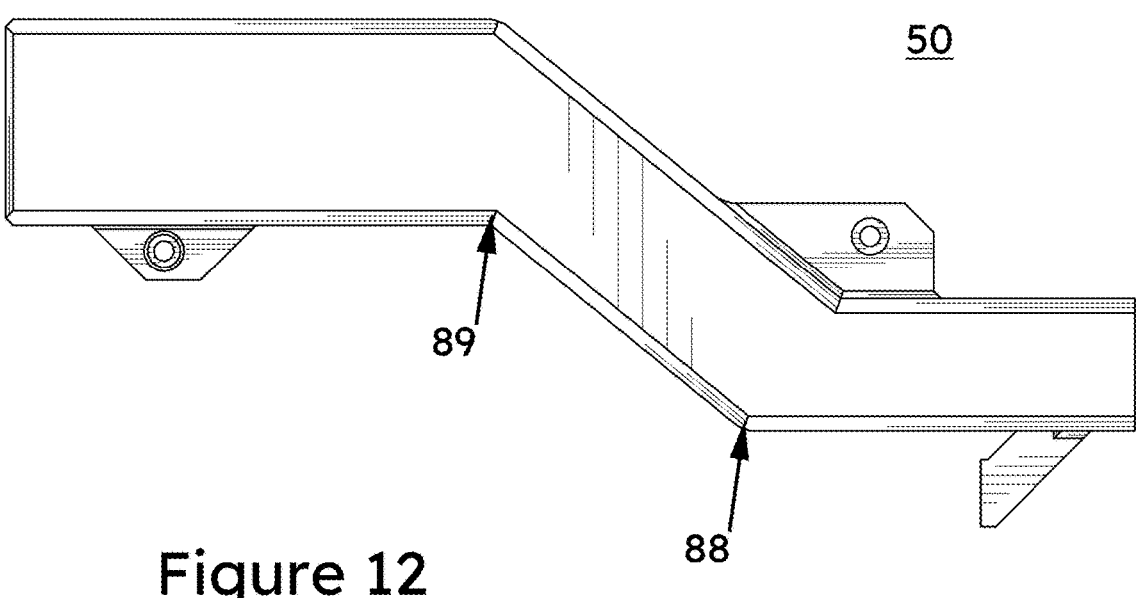
FIG. 12 shows a top plan view of the GPU bracket of FIG. 6.
Figure 13:
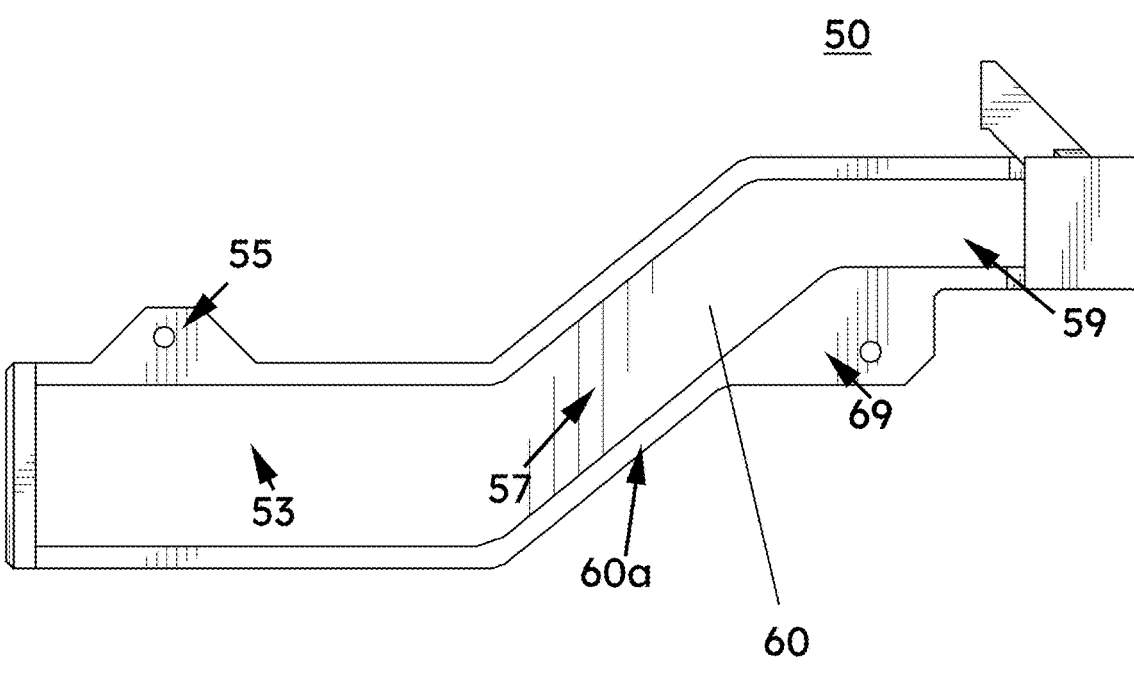
FIG. 13 shows a bottom plan view of the GPU bracket of FIG. 6.

Referring now to FIGS. 6 and 7 simultaneously, a perpendicular bend 75, in some embodiments of the disclosed technology, Rounding out the views of the bracket so that all sides are visible, FIG. 8 shows a left side elevation view of the GPU bracket of FIG. 6. FIG. 9 shows a right side elevation view of the GPU bracket of FIG. 6. FIG. 10 shows a front side elevation view of the GPU bracket of FIG. 6. FIG. 11 shows a rear side elevation view of the GPU bracket of FIG. 6. FIG. 12 shows a top plan view of the GPU bracket of FIG. 6. FIG. 13 shows a bottom plan view of the GPU bracket of FIG. 6. One can see the flanges, such as flange 51 parallel to, and out of line with the back plate 63 with connectors/portals for a cable/wires 34. That is, flange 51 is parallel to, and diagonally positioned, relative to the back plate 63. This is as a result of two opposite angle acute bends in the horizontal arm 60, as shown especially in FIGS. 12 and 13. A first proximal (to the vertical arm) acute bend 88 and a second distal (to the vertical arm) acute bend 89 are shown at a same degree measurement to each other, albeit each being obtuse relative to each other.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A bracket with a first section and a second section joined perpendicular to each other, comprising:

said first section of said two sections further comprising:

a flat back side;

a front side, opposite said flat back side, having an indented region adjacent to a perpendicular bend between said first section and said second section;

said second section further comprising, in order, a proximate region, a mid-region, and a distal region;

said proximate region adjacent to said perpendicular bend between said first section and said second section;

said proximate region being perpendicular to said first section of said bracket;

said mid-region joining said proximate region at an acute bend;

said distal region joining said mid-region at an end of said mid-region opposite said proximate region and parallel to said proximate region;

further comprising at least a first screw hole passing through said indented region of said first section of said two sections; and a flange of said proximate region comprising a second screw hole.

2. The bracket of claim 1, wherein said bracket is a single, unitary structure.

3. The bracket of claim 1, wherein said proximate region of said second section and said distal region of said second section are inverse acutely angled relative to said mid-region of said second section.

4. The bracket of claim 1, wherein an additional flange is attached to a side of said first section below said indented region with at least a third screw hole.

5. The bracket of claim 4, wherein at least said first screw hole, said second screw hole, and at least said third screw hole are placed to correspond with a respective first screw hole, second screw hole, and third screw hole of a graphics processing unit.

6. The bracket of claim 4, wherein said bracket is adapted to be screwed into a motherboard by way of at least said first screw hole and said bracket is adapted to be screwed into a graphics processing unit by way of said second screw hole and at least said third screw hole.

7. A bracket comprising:

a channel with side walls and a front wall, said channel being closed at a bottom side thereof and open at a top side thereof;

a back plate connected to, and perpendicular to, said bottom side of said channel;

said back plate having an indented region surrounded by side walls joining, at least on one side, with a side wall of said channel;

said back plate further comprising an outdented region, outdented relative to said indented region, distal to said channel.

8. The bracket of claim 7, comprising:

at least one first screw hole in said outdented region of said back plate;

at least one second screw hole in said indented region of said back plate;

at least one third screw hole on a flange extending outwards from said channel.

9. The bracket of claim 8, wherein said at least one first screw hole, said at least one second screw hole, said at least one third screw hold, and said at least one fourth screw hole correspond to positions of screw holes of a graphics processing unit and a motherboard, simultaneously.

10. The bracket of claim 7, further comprising at least one fourth screw hole on a flange extending outwards from said channel in a direction opposite said flange with said at least one third screw hole.

11. The bracket of claim 7, wherein said channel comprises a cutaway in one of the side walls adjacent to said back plate adapted for passage of a power cable into said channel through said cutaway.

12. A bracket, comprising:

a first arm adapted for attachment and abutment against a motherboard;

a second arm attached perpendicular to said first arm, said second arm extending away from said motherboard when said first arm is attached and abutted against said motherboard;

a flange attached perpendicular to said second arm, wherein said flange is parallel to said first arm and extends out of a plane defined by a most elongated length of a rest of second arm;

wherein said first arm comprises an indented region, proximal to said second arm, and an outdented region distal to said second arm, said outdented region being outdented relative to said indented region and side walls surrounding said indented region, and said indented region corresponding to a side of a graphics processing unit adapted for abutment to said first arm while being simultaneously attached to said second arm between said first arm and said flange.

13. The bracket of claim 12, wherein:

said second arm has two acute bends;

a most distal region of said second arm is parallel to a most proximal region of said second arm; and a region between said most distal region and said most proximal is at a diagonal to said most distal region and said most proximal region.

14. The bracket of claim 13, further comprising screw holes that extend through:

said first arm at locations corresponding to screw holes of said motherboard; and said second arm at locations corresponding to screw holes of a graphics processing unit adapted to be electrically connected to said motherboard.

15. The bracket of claim 13, further comprising a channel extending through said second arm extending, between said first arm and said flange or an additional flange extending parallel to said first arm.

16. The bracket of claim 15, wherein said channel extends perpendicularly through part of said first arm.

\* \* \* \* \*